US005688203A

United States Patent [19]

Yamamoto et al.

[11] Patent Number: 5,688,203

[45] Date of Patent: Nov. 18, 1997

[54] PLANETARY GEAR REDUCTION STARTER

[75] Inventors: Kyohei Yamamoto; Shuzo Isozumi; Takashi Yamamoto, all of Tokyo, Japan

[73] Assignee: Mitsubishi Denki Kabushiki Kaisha, Tokyo, Japan

[21] Appl. No.: 593,443

[22] Filed: Jan. 29, 1996

[30] Foreign Application Priority Data

Apr. 20, 1995 [JP] Japan .................................... 7-095016

[51] Int. Cl.[6] ................................................ F16H 57/08

[52] U.S. Cl. ................................................ 475/331; 74/7 E

[58] Field of Search .................................... 475/331, 336, 475/334, 338; 74/7 E, 7 A

[56] References Cited

U.S. PATENT DOCUMENTS

| | | | |
|---|---|---|---|
| 4,635,489 | 1/1987 | Imamura et al. | 74/7 E |
| 4,680,979 | 7/1987 | Morishita et al. | 74/7 E |
| 4,712,451 | 12/1987 | Morishita et al. | 74/7 E X |
| 4,902,905 | 2/1990 | Morishita | 74/7 A X |
| 4,951,515 | 8/1990 | Morishita et al. | 74/7 E |
| 5,157,978 | 10/1992 | Morishita et al. | 74/7 E |
| 5,195,389 | 3/1993 | Isozumi | 74/7 E |
| 5,267,918 | 12/1993 | Shiroyama | 475/331 |
| 5,307,702 | 5/1994 | Spellman et al. | 74/7 E |
| 5,323,663 | 6/1994 | Ohgi et al. | 74/7 E |
| 5,509,864 | 4/1996 | Hauser | 475/331 X |

*Primary Examiner*—Charles A. Marmor
*Assistant Examiner*—Peter T. Kwon
*Attorney, Agent, or Firm*—Sughrue,Mion,Zinn,Macpeak & Seas, PLLC

[57] ABSTRACT

A planetary gear reduction starter has packing designed to absorb the variations in the axial dimension of a component, so that it eliminates the need of tight control of the axial dimension of the component and enables lower cost, higher productivity, and reduced size of the completed starter. The packing is constituted by an annular section, a jaw which extends in the radial, inward direction from one end of the annular section, and a plurality of projections which are laid out radially at equiangular pitches on the inner surface of the jaw and which have a semicircular section. The annular section of the packing is fitted around the outer peripheral surface of an internal gear assembly and the jaw is held in a compressed state between the end surface of the internal gear assembly and the side surface of the plate. The compressive deformation of the projections varies according to the axial dimension of the internal gear assembly or the plate, thereby absorbing the variations in the axial dimension.

15 Claims, 7 Drawing Sheets

PLANETARY GEAR REDUCTION STARTER

BACKGROUND OF THE INVENTION

1. Field of the Invention

The present invention relates to a planetary gear reduction starter and, more particularly, to a structure of packing which is disposed between a plate of a DC motor and an internal gear assembly and which absorbs axial variations of the internal gear assembly so as to secure the sealing of a planetary gear reduction assembly.

2. Description of the Related Art

FIG. 10 is a cross-sectional view illustrating a conventional planetary gear reduction starter; FIG. 11 is an enlarged cross-sectional view illustrating an essential section of the conventional planetary gear reduction starter; FIG. 12 is a top view illustrative of packing used for the conventional planetary gear reduction starter; and FIG. 13 is a fragmentary view taken on XIII—XIII of FIG. 12.

In the drawings, a starter 1 is equipped with a DC motor 2, an overrunning clutch 4 which is slidably fitted onto a flange 15 connected to an armature rotary shaft **2*b* of the DC motor 2, and planetary gear speed reducing means 5 which decreases the torque of the armature rotary shaft 2*b* and transmits the reduced torque to the clutch outer of the overrunning clutch 4 via the flange 15. A shift lever 6 is driven by an electromagnetic switch 7 to engage or disengage a pinion 8 mounted on an output rotary shaft 3 with or from a ring gear of an engine (not shown). The overrunning clutch 4, the planetary gear speed reducing means 5, and the shift lever 6 are provided inside a bracket 9 which is located in front of the DC motor 2** and which is composed of an aluminum alloy die-cast component.

The planetary gear speed reducing means 5 is constituted by an internal gear assembly 11 composed of a resin molded component fitted in a groove 10 provided in the inner peripheral surface of the bracket 9, a spur gear 12 provided at the front end of the armature rotary shaft **2*b* of the DC motor 2, and a plurality of planetary gears 13 which mesh with both an internal gear 11*a* of the internal gear assembly 11 and the spur gear 12**.

A sleeve bearing 14 is fitted onto the planetary gears 13; the sleeve bearing 14 is pivotally supported by a supporting pin 16 which is fitted to the flange 15. The flange 15 is pivotally supported by a sleeve bearing 17 which is fitted to a flange **11*b* of the internal gear assembly 11. The front end of the armature rotary shaft 2*b* of the DC motor 2 is rotatably supported by a sleeve bearing 18 fitted in the groove provided at the center of the flange 15**.

A plate 19 is provided at the front end of a yoke **2*a* of the DC motor 2. Packing 20 is compressed and held between the plate 19 and the internal gear assembly 11. The packing 20 is made of an elastic component made of rubber or the like; it is constructed by an annular section 20*a* fitted onto the outer peripheral surface of the internal gear assembly 11 and a jaw 20*b* shaped in a ring which is extended from one end of the annular section 20*a* and which has a smaller diameter than the annular section 20*a***.

The operation of the conventional planetary gear reduction starter described above will now be described.

First, the moment the DC motor 2 is energized, the revolution of the armature rotary shaft **2*b* is delivered from the spur gear 12 to the planetary gears 13; the speed of the revolution is decreased through the planetary gear speed reducing means 5 before the revolution is transmitted to the overrunning clutch 4 and the output rotary shaft 3. At this time, the pinion 8 meshed with the overrunning clutch 4 is driven to start the ring gear of an engine which is engaged with the pinion 8**.

The inner peripheral surface of the ring section **20*a* of the packing 20 is in close contact with the outer peripheral surface of the internal gear assembly 11 and the jaw 20*b* is held in the compressed state between the side surface of the plate 19 and the end surface of the internal gear assembly 11 so as to seal the internal gear assembly 11 with the packing 20. This construction prevents grease from leaking out of the internal gear assembly 11 and also water from getting into the internal gear assembly 11** from outside.

The repulsive elastic force of the jaw **20*b* of the packing 20 works to cause the internal gear assembly 11 to repel the plate 19 in the axial direction. Therefore, the internal gear assembly 11 is positioned by bringing it in contact with the end surface of the groove 10 of the bracket 9 to secure it in position without play. Likewise, the plate 19 is positioned by bringing it in contact with the front end surface of the yoke 2*a*** to secure it in position without play.

The plate 19 closes the opening at the rear end of the internal gear assembly 11 to prevent the planetary gears 13 from coming out of the internal gear assembly and also prevent dust from a brush of the DC motor 2 from coming into the internal gear assembly 11, thereby assuring the speed reduction performed by the planetary gear speed reducing means 5.

Since the conventional planetary gear reduction starter is configured as stated above, the variations in the axial dimensions of the internal gear assembly 11, the plate 19, etc. are absorbed by the jaw **20*b* of the packing 20. Making the starter smaller requires the packing 20 be made thinner and the major variations in the axial dimensions of the components can no longer be absorbed. This leads to the need for higher accuracy in the dimensions of the components. For this reason, such components as the internal gear assembly 11 and the plate 19** are press-molded first to have slightly larger dimensions and then ground to the desired dimensions. This posed a problem in that more materials and more machining steps are required with resultant higher cost and lower productivity.

SUMMARY OF THE INVENTION

The present invention has been accomplished with a view toward solving the problem described above and it is an object of the present invention to provide a planetary gear reduction starter which incorporates packing of a structure which makes it possible to absorb the variations in the axial dimensions of components so as to enable the planetary gear reduction starter to eliminate the need for tight control of the axial dimensions of the components including an internal gear assembly and a plate and also to achieve lower cost, higher productivity, and smaller size of the completed starter.

In order to achieve the above object, according to one aspect of the present invention, there is provided a planetary gear reduction starter equipped with a DC motor, an output rotary shaft with a pinion which meshes with the ring gear of an engine, a spur gear provided at the front of the armature rotary shaft of the DC motor, a flange which is formed at the rear end of the output rotary shaft and which pivotally supports the front end of the armature rotary shaft, an internal gear assembly which is fitted in the groove of a bracket to pivotally support the flange and which is provided with an internal gear on the internal peripheral surface thereof, a plurality of planetary gears which are pivotally supported on the flange in such a way that they engage with both the spur gear and the internal gear, a plate located at the front end of the yoke of the DC motor, and packing which has an annular section and a jaw which extends from one end of the annular section and which has a smaller diameter of the annular section, the annular section being fitted around the outer periphery of the internal gear assembly, the jaw being held between the end surface of the internal gear assembly and the side surface of the plate, and the jaw having an absorber for absorbing the variations in the axial dimensions of the internal gear assembly.

DETAILED DESCRIPTION OF THE PREFERRED EMBODIMENTS

Embodiment 1

Figure 1:
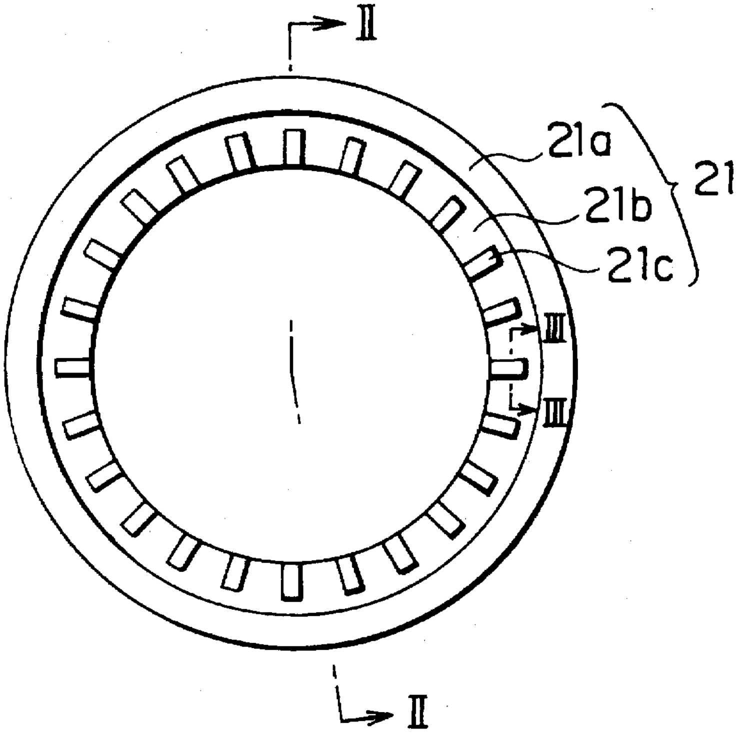
FIG. 1 is a top view showing the packing employed for a planetary gear reduction starter related to a first embodiment of the present invention.
Figure 2:
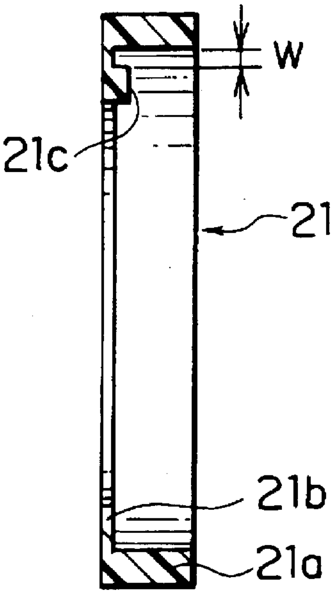
FIG. 2 is a fragmentary cross-sectional view taken II—II of FIG. 1.
Figure 3:
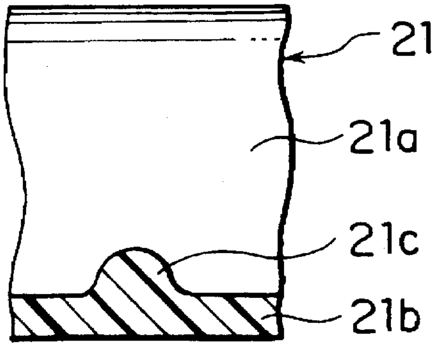
FIG. 3 is a fragmentary cross-sectional view taken on III—III of FIG. 1.
Figure 10:
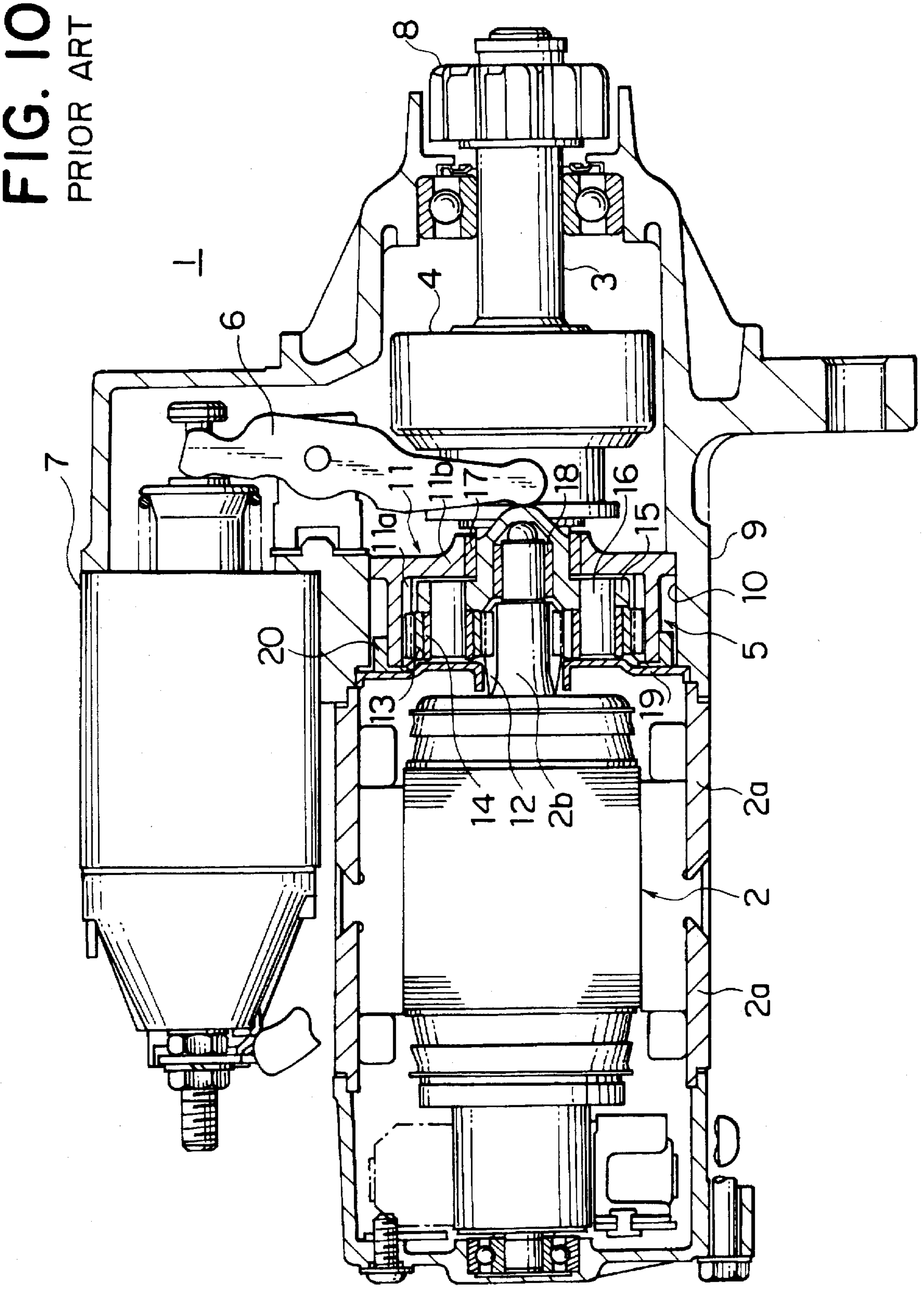
FIG. 10 PRIOR ART
FIG. 10 is a cross-sectional view illustrative of a conventional planetary gear reduction starter.
Figure 11:
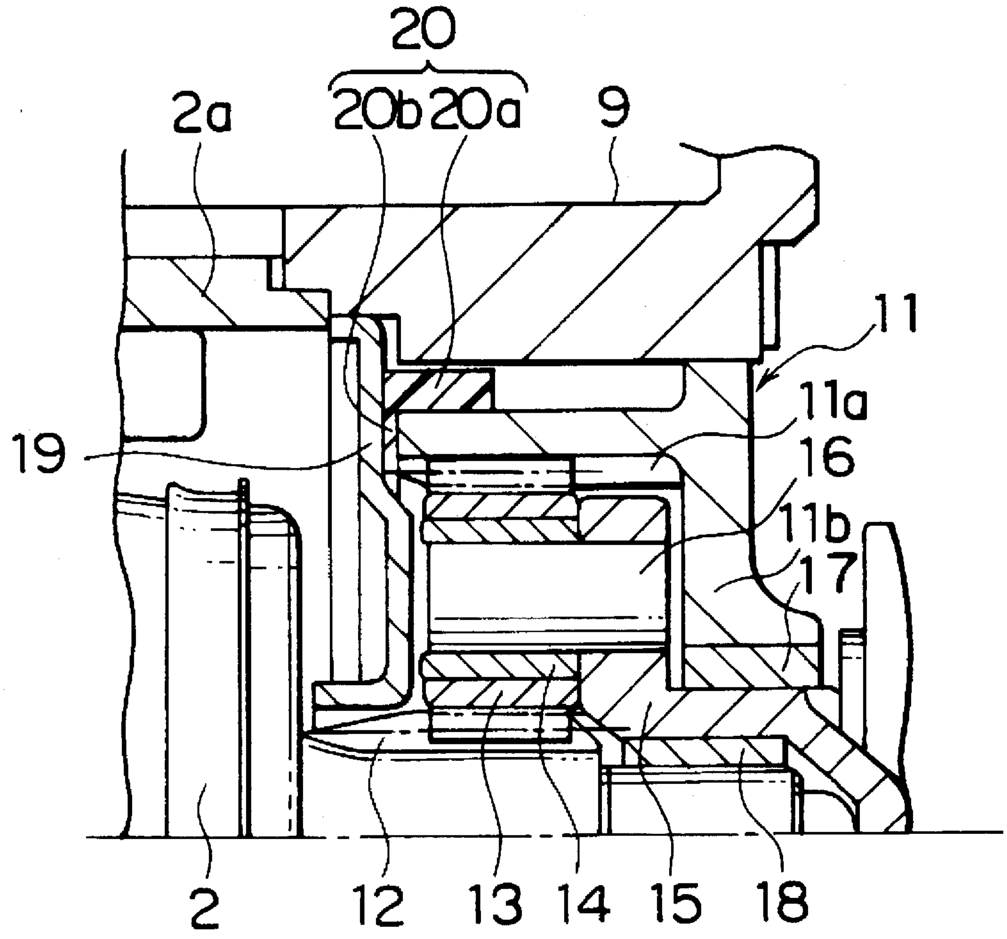
FIG. 11 PRIOR ART
FIG. 11 is an enlarged cross-sectional view illustrative of an essential section of the conventional planetary gear reduction starter.
Figure 12:
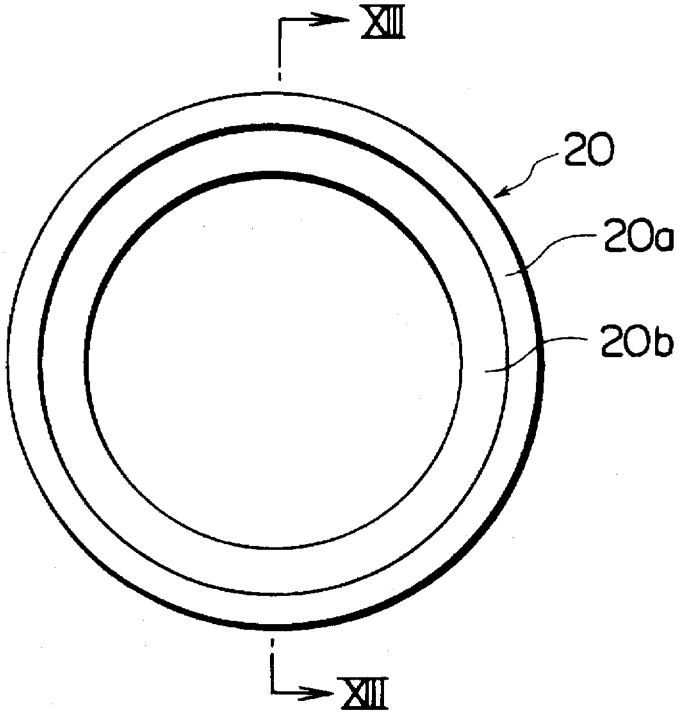
FIG. 12 PRIOR ART
FIG. 12 is a top view showing the packing employed for the conventional planetary gear reduction starter.
Figure 13:
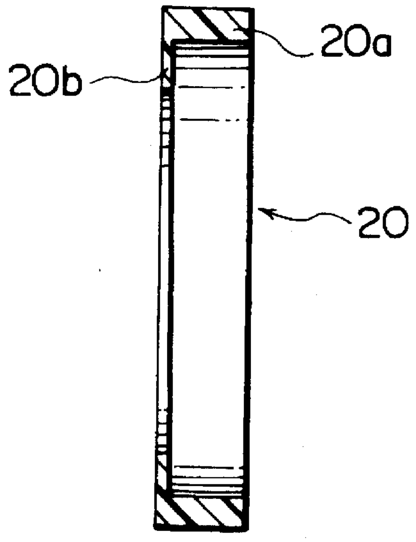
FIG. 13 PRIOR ART
FIG. 13 is fragmentary cross-sectional view taken on XIII—XIII of FIG. 12.

FIG. 1 is the top view showing the packing employed for the planetary gear reduction starter related to the first embodiment of the present invention; FIG. 2 is the fragmentary cross-sectional view taken on II—II of FIG. 1; and FIG. 3 is the fragmentary cross-sectional view taken on III—III of FIG. 1. In the drawings, packing 21 is composed of an elastic member such as a rubber; it is constituted by an annular section 21*a* fitted around the outer peripheral surface of the internal gear assembly 11, a jaw 21*b* shaped in a ring which is extended from one end of the annular section 21*a* and which has a smaller diameter than the annular section 21*a*, and a plurality of projections 21*c* which are formed radially on the inner surface of the jaw 21*b* at equiangular pitches and which have a semicircular sectional shape. The projections 21*c* constitute an absorber for absorbing the variations in axial dimensions of the internal gear assembly 11 and the plate 19 and they have gap W between themselves and the inner wall surface of the annular section 21*a*. The planetary gear reduction starter according to the first embodiment has the same configuration as that of the conventional planetary gear reduction starter shown in FIG. 10 and FIG. 11 except for the shape of the packing 21 and the operation thereof is the same; therefore, the description of the operation will be omitted.

To install the packing 21 having the structure stated above, the plate 19 is first mounted onto the armature rotary shaft 2*b* to locate it on the end surface of the yoke 2*a*. The flange 15 is moved in the axial direction to fit it on the sleeve bearing 17 of the internal gear assembly 11 so that the internal gear 11*a* meshes with the planetary gear 13. Then, the packing 21 is fitted to the internal gear assembly 11 and the internal gear assembly 11 is located in the groove 10 of the bracket 9. After that, the bracket 9 is moved in the axial direction to the armature rotary shaft 2*b* onto the sleeve bearing 18 of the flange 15 so that the spur gear 12 meshes with the planetary gear 13, thereby connecting the DC motor 2 with the bracket 9.

Thus, the inner peripheral surface of the annular section 21*a* of the packing 21 is brought in close contact with the outer peripheral surface of the internal gear assembly 11 and the jaw 21*b* is held in the compressed state between the side surface of the plate 19 and the end surface of the internal gear assembly 11, thereby sealing the internal gear assembly by the packing 21. At this time, the projections 21*c* are deformed under the pressure applied by the end surface of the internal gear assembly 11.

The structure prevents the grease from coming out of the internal gear assembly 11 and also prevents water outside from going into the internal gear assembly 11.

The repulsive elastic force of the jaw 21*b* of the packing 21 works to cause the internal gear assembly 11 to repel the plate 19 in the axial direction. Therefore, the internal gear assembly 11 is positioned by bringing it in contact with the end surface of the groove 10 of the bracket 9 to secure it in position without play. Likewise, the plate 19 is positioned by bringing it in contact with the front end surface of the yoke 2*a* to secure it in position without play.

The plate 19 closes the opening at the rear end of the internal gear assembly 11 to prevent the planetary gears 13 from coming out of the internal gear assembly 11 and also to prevent dust from a brush of the DC motor 2 from coming into the internal gear assembly 11, thereby assuring the speed reduction performed by the planetary gear speed reducing means 5.

According to the first embodiment, even if the axial dimensions of the internal gear assembly 11 and the plate 19 vary, the deformation of the projections 21*c* of the packing 21 under compression increases or decreases to absorb the variations of the axial dimensions. This eliminates the need for tight control for assuring accurate dimensions of the internal gear assembly 11 and the plate 19, thus making it possible to avoid wasting materials and eliminate the need of the extra process, namely, grinding. The result is lower cost and higher productivity. Further, the components can be used for other similar internal gear assembly, thus expanding the application range of the components.

In addition, the projections 21*c* are radially formed on the inner surface of the jaw 21*b* at equiangular pitches to allow adequate deformation of the projections 21*c* under compression. This makes it possible to reduce the gap between the end surface of the internal gear assembly 11 and the side surface of the plate 19 thereby permitting a reduced size of the completed starter.

There is still another advantage: since gap W is provided between the projections 21*c* and the inner wall surface of the annular section 21*a*, the deformation of the projections 21*c* under compression does not affect the engagement between the inner peripheral surface of the annular section 21*a* and the outer peripheral surface of the internal gear assembly 11. This ensures the sealing around the outer peripheral surface of the internal gear assembly 11.

Embodiment 2

Figure 4:
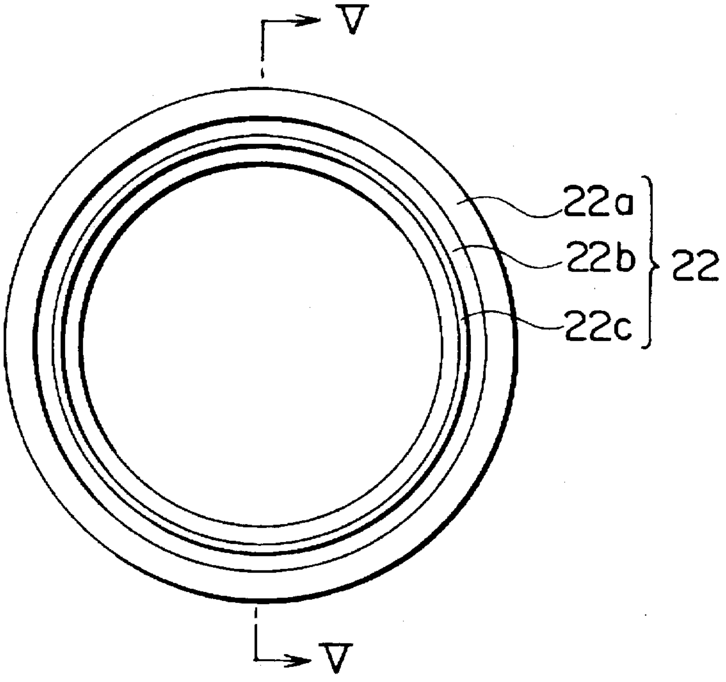
FIG. 4 is a top view showing the packing employed for a planetary gear reduction starter related to a second embodiment of the present invention.
Figure 5:
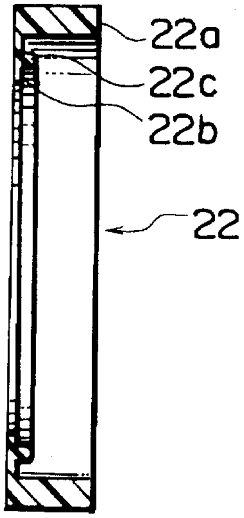
FIG. 5 is a fragmentary cross-sectional view taken on V—V of FIG. 4.

While the first embodiment described above is provided with the plurality of projections 21*c* formed radially on the inner surface of the jaw 21*b* of the packing 21 at equiangular pitches to absorb the dimensional variations, the second embodiment is provided with a ring-shaped projection 22*c* which has a semicircular section and which is formed on the inner surface of a jaw 22*b* of packing 22 as illustrated in FIG. 4 and FIG. 5 to absorb the dimensional variations. The packing 22 has an annular section 22*a* which is similar to the annular section 21*a* of the packing 21 in the first embodiment.

In the second embodiment, the inner peripheral surface of the annular section 22*a* of the packing 22 is in close contact with the outer peripheral surface of the internal gear assembly 11. Further, the projection 22*c* deforms under compression and the jaw 22*b* is held in the compressed state between the side surface of the plate 19 and the end surface of the internal gear assembly 11, thereby sealing the internal gear assembly 11 by the packing 22. Hence, the second embodiment provides the same advantage as that provided by the first embodiment.

Furthermore, according to the second embodiment, the projection 22*c* is formed into a ring, so that the jaw 22*b* is held under uniform circumferential pressure between the end surface of the internal gear assembly 11 and the plate 19. This structure ensures improved the sealing performance.

Embodiment 3

Figure 6:
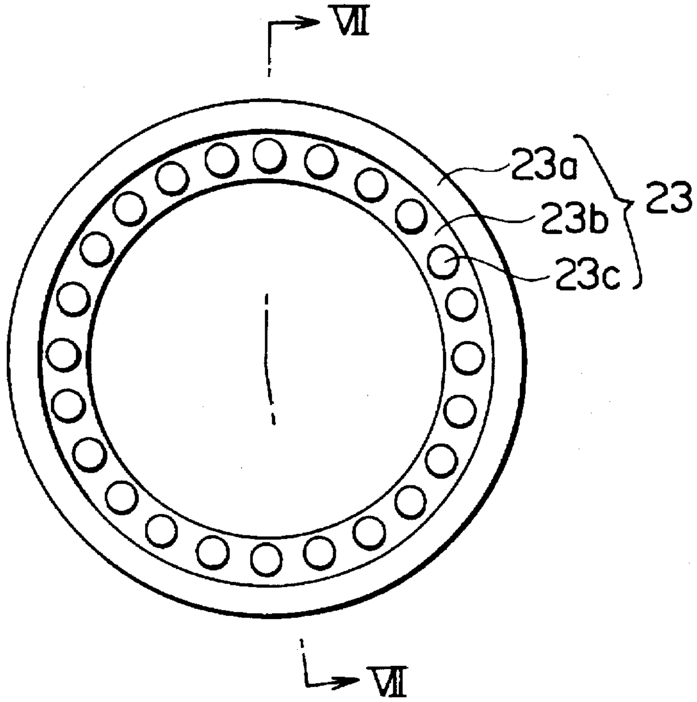
FIG. 6 is a top view showing the packing employed for a planetary gear reduction starter related to a third embodiment of the present invention.
Figure 7:
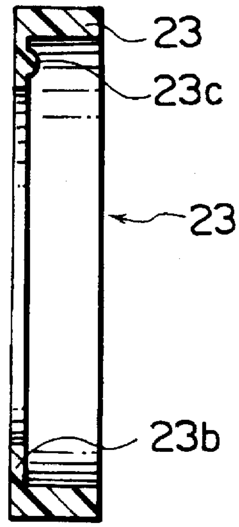
FIG. 7 is a fragmentary cross-sectional view taken on VII—VII of FIG.

While the first embodiment described above is provided with the plurality of projections 21*c* formed radially on the inner surface of the jaw 21*b* of the packing 21 at equiangular pitches to absorb the dimensional variations, the third embodiment is provided with a plurality of semispherical projections 23*c* which are radially formed on the inner surface of a jaw 23*b* of packing 23 at equiangular pitches as illustrated in FIG. 6 and FIG. 7 to absorb the dimensional variations. The packing 23 also has an annular section 23*a* which is similar to the annular section 21*a* of the packing 21 in the first embodiment.

In the third embodiment, the inner peripheral surface of the annular section 23*a* of the packing 23 is in close contact with the outer peripheral surface of the internal gear assembly 11. Further, the projections 23*c* deform under compression and the jaw 23*b* is held in the compressed state between the side surface of the plate 19 and the end surface of the internal gear assembly 11, thereby sealing the internal gear assembly 11 by the packing 23. Hence, the third embodiment provides the same advantage as that provided by the first embodiment.

Furthermore, according to the third embodiment, since the plurality of semispherical projections 23*c* are formed at equiangular pitches on the inner surface of the jaw 23*b*, the mold for making the packing 23 can be easily produced.

Embodiment 4

Figure 8:
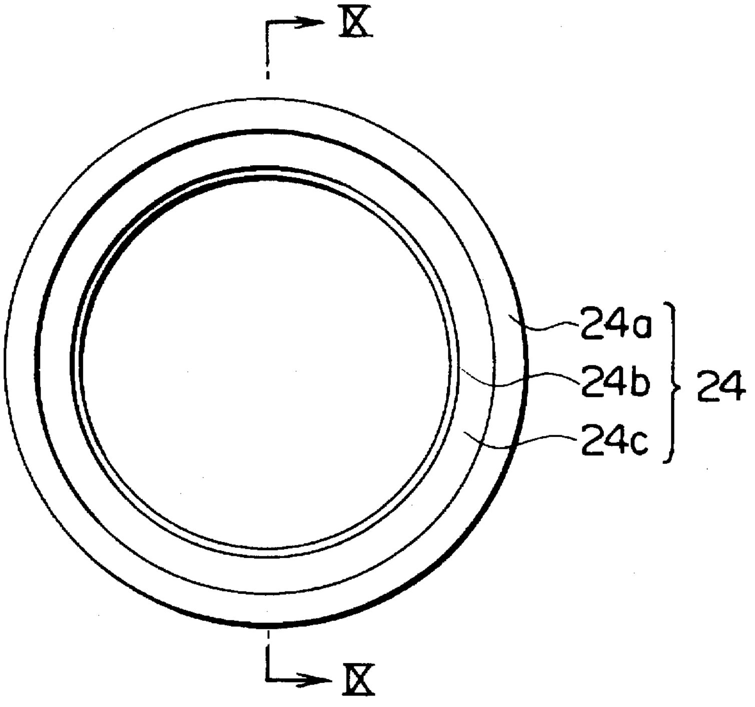
FIG. 8 is a top view showing the packing employed for a planetary gear reduction starter related to a fourth embodiment of the present invention.
Figure 9:
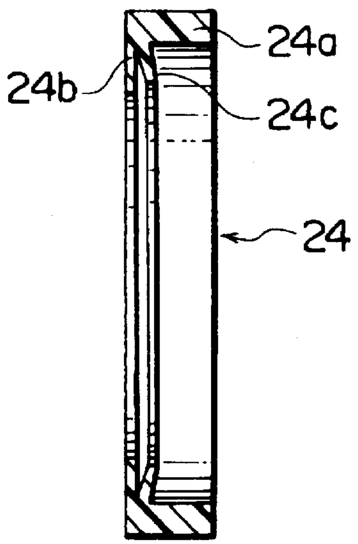
FIG. 9 is a fragmentary cross-sectional view taken on IX—IX of FIG. 8.

While the first embodiment described above is provided with the plurality of projections 21*c* formed radially on the inner surface of the jaw 21*b* of the packing 21 at equiangular pitches to absorb the dimensional variations, the fourth embodiment is provided with a ring-shaped lip 24*c* which is formed on the inner surface of a jaw 24*b* of packing 24 and which extends in the radial, inward direction with an axial slant from the intersection of an annular section 24*a* and the jaw 24*b* as illustrated in FIG. 8 and FIG. 9 to absorb the dimensional variations.

In the fourth embodiment, the inner peripheral surface of the annular section 24*a* of the packing 24 is in close contact with the outer peripheral surface of the internal gear assembly 11. Further, the lip 24*c* deforms under compression toward the jaw 24*b* and the jaw 24*b* is held in the compressed state between the side surface of the plate 19 and the end surface of the internal gear assembly 11, thereby sealing the internal gear assembly 11 by the packing 24. Hence, the fourth embodiment provides the same advantage as that provided by the first embodiment.

In the embodiments described above, the section for absorbing the variations are formed on the inner surface of the jaw of the packing, i.e. on the surface closer to the internal gear assembly 11; however, the section for absorbing the variations may alternatively be formed on the outer surface of the jaw of the packing, i.e. on the surface closer to the plate 19, or it may be formed on both inner and outer surfaces of the jaw.

Further in the embodiments described above, the plate 19 is discrete from the yoke 2*a*; however, the same advantages can be achieved even when the plate 19 is formed at the front end of the yoke 2*a* as an integral part thereof.

Furthermore, in the embodiments described above, the internal gear assembly 11 is made of the resin molded component; however, the material used for the internal gear assembly 11 is not limited to the resin molding. Other component such as an aluminum component may be used to accomplish the same advantages.

The present invention, which is configured as described above, provides the following advantages:

According to the present invention, the jaw of the packing is provided with the section for absorbing the variations in the axial dimensions of the internal gear assembly. This enables a planetary gear reduction starter which eliminates the need of strict control of the axial dimensions of the internal gear assembly and permits reduced material cost, easy fabrication, lower cost, higher productivity, and compact design.

Further according to the present invention, the section for absorbing variations is constructed by the projections formed on at least one surface of the jaw of the packing; therefore, the projections deform under compression according to the axial dimension of the internal gear assembly so as to absorb the variations in the axial dimension. Moreover, the projections, which are provided circumferentially at equiangular pitches, cause the repulsive elastic force generated by the compressive deformation of the projections to be applied to the jaw circumferentially and uniformly, thereby ensuring the sealing performance of the packing.

Further according to the present invention, the section for absorbing the variations is constructed by a projection formed on at least one surface of the jaw of the packing; therefore, the projection deforms under compression according to the axial dimension of the internal gear assembly so as to absorb the variations in the axial dimension. Moreover, the projection, which is provided annularly, causes the repulsive elastic force generated by the compressive deformation of the projection to be applied to the jaw circumferentially and more uniformly, thereby ensuring the sealing performance of the packing.

Further according to the present invention, the section for absorbing the variations is provided on the surface of the jaw of the packing on the side of the internal gear assembly; therefore, the repulsive elastic force generated by the compressive deformation of the section for absorbing the variations works to improve the close contact between the surface of the jaw on the side of the internal gear assembly and the side surface of the plate, thereby assuring enhanced sealing performance of the packing.

Further according to the present invention, the projection is formed on the surface of the jaw away from the inner wall surface of the annular section. Hence, the compressive deformation of the projection does not directly affect the annular section of the packing and therefore it does not affect the close contact between the inner peripheral surface of the annular section and the outer peripheral surface of the internal gear assembly, thus securing the sealing performance of the packing.

What is claimed is:

1. A planetary gear reduction starter comprising:

a DC motor;

an output rotary shaft with a pinion which meshes with a ring gear of an engine;

a spur gear provided at the front of an armature rotary shaft of said DC motor;

a flange which is formed at the rear end of said output rotary shaft and which pivotally supports the front end of said armature rotary shaft;

an internal gear assembly which is fitted in the groove of a bracket to pivotally support said flange and which is provided with an internal gear on the internal peripheral surface thereof;

a plurality of planetary gears which are pivotally supported on said flange to allow engaging of said planetary gears with both said spur gear and said internal gear;

a plate located at the front end of a yoke of said DC motor; and packing which has an annular section and a jaw which extends from one end of said annular section and which has a smaller diameter of said annular section, said annular section being fitted around the outer periphery of said internal gear assembly, said jaw being held between the end surface of said internal gear assembly and the side surface of said plate, and said jaw having at least one projection for absorbing the variations in the axial dimensions of said internal gear assembly.

2. A planetary gear reduction starter according to claim 1, wherein said at least one projection for absorbing variations provided on the surface of said jaw closer to said internal gear assembly.

3. A planetary gear reduction starter according to claim 2, wherein said at least one projection for absorbing variations comprises a plurality of projections which are formed circumferentially at equiangular pitches on said surface of said jaw of said packing.

4. A planetary gear reduction starter according to claim 3, wherein said projections are provided on said surface of said jaw away from the inner wall surface of said annular section of said packing.

5. A planetary gear reduction starter according to claim 2, wherein said at least one projection for absorbing variations comprises a projection which is formed annularly on said surface of said jaw.

6. A planetary gear reduction starter according to claim 5, wherein said projection is provided on said surface of said jaw away from the inner wall surface of said annular section of said packing.

7. A planetary gear reduction starter according to claim 1, wherein said at least one projection for absorbing variations is provided on at least one of the surface of said jaw closer to said internal gear assembly and the surface of said jaw closer to said plate.

8. A planetary gear reduction starter according to claim 7, wherein said at least one projection for absorbing variations comprises a single ring shaped projection formed annularly on a surface of said jaw.

9. A planetary gear reduction starter according to claim 7, wherein said at least one projection for absorbing variations comprises a plurality of semispherical projections which are formed circumferentially at equiangular pitches on said jaw.

10. A planetary gear reduction starter according to claim 7, wherein said at least one projection for absorbing variations comprises a ring shaped lip.

11. A planetary gear reduction starter according to claim 10, wherein said ring shaped lip extends radially from said jaw with an axial slant from the intersection of said annular section and said jaw.

12. A planetary gear reduction starter according to claim 7, wherein said plate is integral with said yoke.

13. A planetary gear reduction starter according to claim 7, wherein said plate is discrete from said yoke.

14. A planetary gear reduction starter according to claim 7, wherein said internal gear assembly is formed of a resin molded component.

15. A planetary gear reduction starter according to claim 7, wherein said internal gear assembly is formed of aluminum.

* * * * *